Oct. 5, 1965  W. J. CANELL  3,209,970
SKI CARRIERS
Filed Aug. 8, 1963
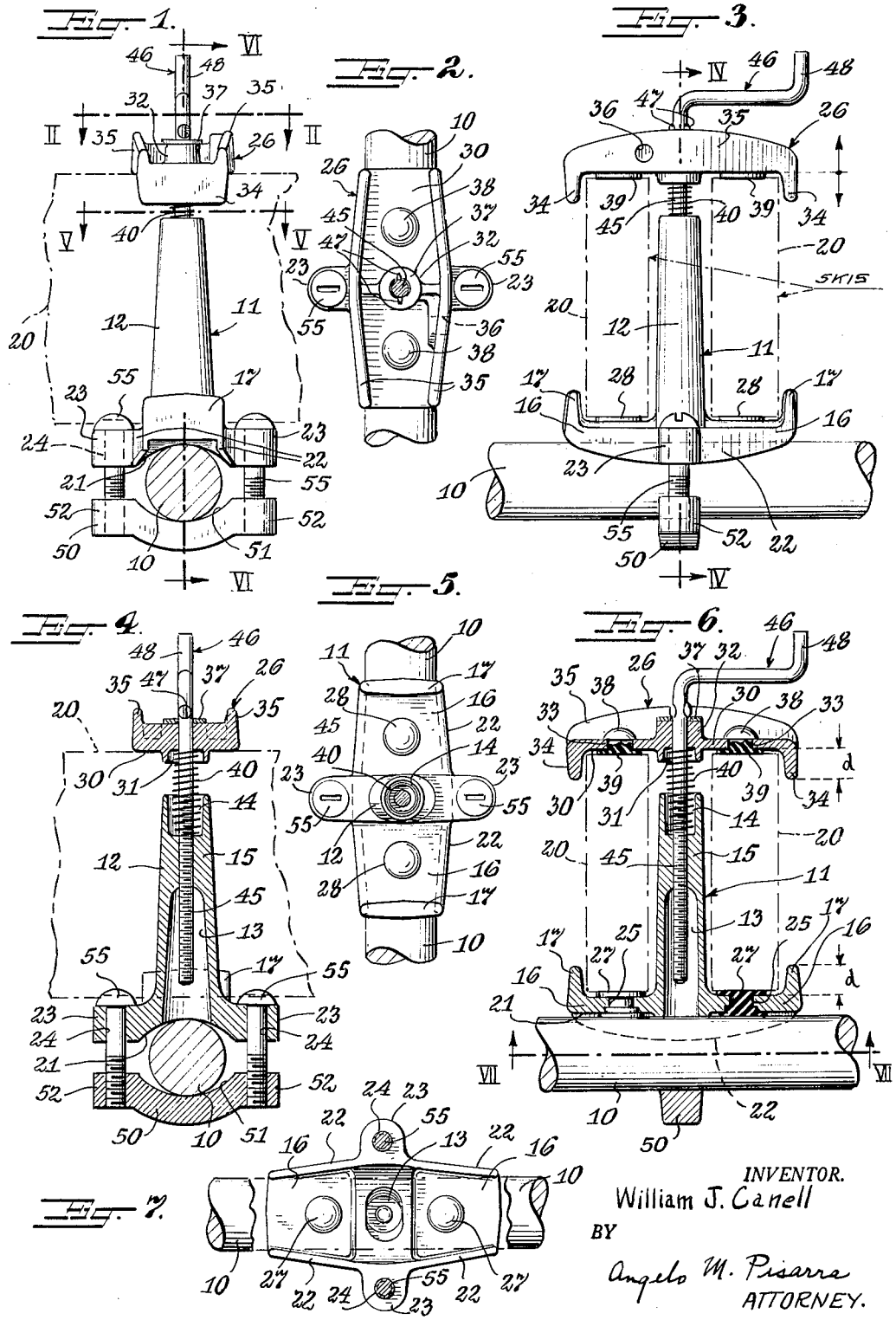
INVENTOR.
William J. Canell
BY
Angelo M. Pisarra
ATTORNEY.

United States Patent Office 3,209,970
Patented Oct. 5, 1965

3,209,970
SKI CARRIERS
William J. Canell, 11 Linden Terrace, Leonia, N.J.
Filed Aug. 8, 1963, Ser. No. 300,858
2 Claims. (Cl. 224—42.1)

This invention relates to novel ski-clamps or ski holders adapted to be mounted on cross bars and especially to the cross bars of the common or conventional racks carried on automobile tops or trunks.

Prior to my invention others have suggested various constructions and designs for ski-clamps or carriers. So far as I know none of them has been to any great extent accepted by the public apparently due to their inherent constructional, operational and/or economical deficiencies. One of them which has been proposed is that disclosed in the U.S. patent to Wubben 2,434,826 issued Jan. 20, 1948. As shown in that patent the top of an automobile is provided with a pair of tranverse bars secured to the top of an automobile and spaced therefrom. A number of ski-clamps are secured to each of said bars. Each ski-clamp consists of an inverted U shaped section of strap metal whose legs terminate in outwardly extending feet whose outer ends are bent upwardly. A stem or rod extends through an opening in the cross piece of the inverted U strap and also through an opening in a movable cross piece. The lower end of the stem is provided with a stop element and the upper end of the stem is threaded and has a nut coupled therewith. Surrounding said stem and disposed between the cross piece of said inverted U strap and the stop element is a spring which tends to move the stem downwardly and to maintain the stem under tension and therefore tending to urge the cross bar downwardly. The ski-clamp apparently is secured to the supporting cross bar by welding.

Said ski-clamps have not found wide spread acceptance for various reasons, among which I believe are the following: they are not adapted for ready coupling to and uncoupling from automobile-top racks; they have a great susceptibility for being rendered inoperative by the elements due to the great exposure of the stem and spring; the nut is apt to get lost upon removal from the stem and this sometimes can happen; and changing the tension of the spring by actuating the nut can be a very cumbersome and trying task especially in cold weather when skis are normally used, the skis are not positively clamped in position so that if sufficient upward force is accidently applied to the movable cross by the skis themselves for example in going over a rut, the bar may be lifted upwardly against the action of the spring thereon thereby to accidently release the skis from the clamp.

This present invention has been made to provide novel ski-clamps or ski-holders which are superior to those of the prior art.

Accordingly the main object of this invention is to provide novel ski-holders or ski-clamps which are adapted for quick and easy coupling to a bar of a rack carried by an automobile roof top or trunk top, with the ski-holders being so designed that a plurality of skis may be retained thereby for traveling and that the skis to be transported may be readily and easily coupled to and uncoupled therefrom without appreciable danger of loss of parts and also to provide simple, sturdy and economical ski-clamps which are not to any appreciable degree susceptible to being rendered inoperative or otherwise adversely affected by the elements and provide positive clamping action without danger of accidental clamping release.

These as well as other objects and advantages of the present invention will be apparent from the following description and drawings, wherein:

FIG. 1 is a view in end elevation of my novel ski-carrier, when coupled with a bar of an automobile rack, which bar is shown in cross-section, and a fragment of a ski-carried by said ski-carrier is shown in dotted lines.

FIG. 2 is a view taken on line II—II of FIG. 1 in the absence of the ski and in the direction of the arrows.

FIG. 3 is a view in side elevation of FIG. 1 and shows in dotted lines the position of a pair of skis carried by said ski-carrier.

FIG. 4 is a view partially in cross section and partially in end elevation taken on line IV—IV of FIG. 3 in the direction of the arrows.

FIG. 5 is a view taken on line V—V of FIG. 1 in the absence of the ski.

FIG. 6 is a view partially in cross section and partially in side elevation taken on line VI—VI of FIG. 3.

FIG. 7 is a view taken on line VII—VII of FIG. 6, with a portion of the rack rod being omitted.

The conventional or common automobile top and trunk top racks secured to an automobile, include a pair of transversely extending cross bars 10. The rods 10 are spaced from the top to which the rack is secured.

According to this invention, a novel ski-clamp or ski holder, shown in the attached drawing, is secured to each of two of said bars 10 to provide an in-line pair of ski-clamps.

The novel ski-clamp includes a single unitary member 11, which is preferably a casting and therefore may be cheaply produced. The casting 11 consists of an elongated standard or stem 12 roughly of frustro-conical exterior shape and tapering gradually upwardly inwardly when in normal vertical position. The interior of said stem at the lower half thereof is hollow to provide an opening 13 therethrough and the interior of said stem at the upper one-quarter length thereof is also hollow to provide an opening or well 14 therethrough. Integral with said stem 12 and between said openings 13 and 14 is a solid section or nut 15 having a threaded central opening therethrough which is in communication with the openings 13 and 14. Integral with said stem 12 at the lower end thereof are a pair of inline oppositely disposed feet 16 which are at right angles thereto and extend outwardly therefrom. The ends of the feet 16 terminate in upwardly extending shallow toes 17, with the distance between each toe 17 and the stem 12 being only a little greater than the width of the edge of a ski 20 which is to be accommodated therein. The lower face 21 of the stem 12 is curved to accommodate the curvilinear contour of the rod 10. Integral with the feet 16 and extending along the length thereof on each side thereof is a shallow reinforcing, positioning and retaining skirt 22. Integral with said skirt 22 and stem 12 and extending outwardly therefrom at the mid-length thereof are a pair of oppositely disposed ears 23, each having a central opening 24 therethrough. Each foot 16 has an opening 55 through the thickness thereof. Mounted in each opening 25 is a resilient grommet or button 27 composed of rubber or synthetic rubbery plastic material and including a resilient disc 28 onto which rests the lower edge of a ski 20. Buttons 27, like buttons 38 hereafter referred to are alike and are in the shape of a collar button having a small head at one end thereof opposite the disc thereof.

An elongated clamping cross bar 26 is disposed above the upper end of the stem 12 and consists essentially of a channel including an elongated facing plate 30 having a central shallow collar 31 integral therewith and depending therefrom and a central shallow collar 32 integral therewith and extending upwardly therefrom. Integral with the plate 30 and extending along the length thereof on each side thereof is an upstanding shallow skirt 35. One of the skirts 35 has an opening 36 therethrough for accommodating the bow or shackle of a padlock (not shown). The plate 30 has a pair of openings 33 through the thickness thereof at either side of said collars and in line with the openings 25 in feet 16. Mounted in each of the openings 33 is a grommet or button 38 composed of resilient rubber or rubbery plastic material and having a disc head 39 for resiliently bearing against the upper edge of ski 20. Integral with plate 30 at each end thereof is a shallow toe 34 whose depth "$d$" is approximately the same as toe 17. The distance between each toe 34 and collar 31 is only slightly greater than the distance between toe 17 and stem 12. A central opening through plate 30 is in communication with the in-line collars 31 and 32. Resting on the upper face of boss 32 is a washer 37. The lower end of a compression spring 40 is housed in the well 14 whose diameter is slightly greater and is approximately that of spring 40. The spring 40 rests upon and bears against the upper surface of section or nut 15 and is supported thereby. The upper end of the spring 40 is housed in the collar 31 which is of a diameter slightly larger than and approximately that of spring 40. Extending through the washer 37 and collar 32, the central opening in plate 30, collar 31, the central opening in the coil spring 40 and through the threaded opening in section 15 and in the lower opening 13 is the elongated portion 45 of a crank 46. This elongated portion 45 is threaded throughout most of the length thereof and makes threaded engagement with the threaded section 15, and the upper part thereof is pinched to provide a pair of diametrically opposed bearing ears 47 for bearing against washer 37. At right angles to the element 45 and integral therewith at the upper end thereof is an arm which has a shorter arm integral therewith and at right angles thereto thereby to provide a crank handle 48.

A cross bar 50 is located on the underside of rod 10 to demountably couple the ski-clamp thereto. The bar 50 is a narrow saddle whose central interior portion 51 is concave to accommodate the curvilinear contour of rod 10. Saddle 50 terminates in ears 52 having threaded central openings therethrough.

The novel ski-clamp may be easily and readily coupled to a bar 10 of an automobile top or trunk rack by merely positioning the assembled clamp in position as shown in FIGS. 1 and 3, with the feet 16 extending along the length of supporting rod 10, with the resilient heads of buttons 27 on rod 10 and with rod 10 located between the positioning skirts 22 which prevent excessive twisting or turning of stem 12 and feet 16. The saddle 50 is located on the lower side of rod 10 and stud bolts 55 are inserted through the openings in ears 23 and make threaded engagement with the threads in the openings in ears 52 and are screwed down thereby to deform while under pressure the heads of buttons 27 against rod 10 and thereby to removably and resiliently lock the novel ski-clamp in position. Then the handle 48 of the crank 46 is turned to one direction whereupon the crank moves vertically upwardly and due to the action of the spring 40 upon the bar 26, bar 26 automatically moves upwardly. And when bar 26 is so moved to a proper upper position, a ski 20 is inserted in each side of the clamp to rest edgewise on the resilient discs 28 carried by feet 16 and then the crank handle is rotated in the opposite direction and element 47 forces the bar 26 downwardly against the action of spring 40. This action is continued by the user until the discs 39 are forced against the upper edge of skis 20 and the skis between feet 16 and bar 26 are under such pressure between discs 28 and 39 as he deems necessary. The skis 20 are thus maintained in positive clamped condition between feet 16 and bar 26 and may not be accidently released therefrom. Then the bow or shackle of a padlock (not shown) is inserted through opening 36 and around the normally horizontally disposed arm of handle 48 to prevent theft of the skis 20. The vehicle carrying said skis secured thereto is driven to its destination. When the user reaches his destination and then desires to remove the skis from the clamps, the padlock is removed and then he merely turns the handle 48 in the first mentioned direction until the bar 26 is by the action of spring 40 thereon automatically released to the degree which he deems necessary and he removes the skis from said clamp which is now in unclamping condition.

While this invention has been illustrated and described in detail, it is not to be limited thereby, because various changes and modifications of the specific construction shown and described may be made without departing from the spirit thereof.

I claim:
1. A device of the class described comprising:
   (A) a unitary assembly comprising:
   a single unitary member comprising a normally vertical stem having a well in the upper end thereof and extending through the upper extremity thereof, a pair of feet for supporting a pair of skis when respectively disposed edgewise thereon, said feet secured to said stem at the lower end thereof and extending in opposite directions therefrom, a shallow toe secured to the outer end of each of said feet and extending upwardly therefrom, a pair of shallow skirts secured to the lower part of said stem and to the sides of said feet and depending therefrom, a pair of ears secured to said stem, extending outwardly therefrom in opposite directions, disposed at right angles to said feet and having openings therethrough, a nut carried by said stem at a position below the outer extremity thereof and within the outer surface thereof, said single unitary member adapted to be mounted on the top of an elongated support, with said skirts extending along the sides of said support and said stem extending upwardly vertically therefrom;
   a cross bar for clamping said skis in edgewise position to said feet, said bar having a central opening therethrough, a central collar depending therefrom, and shallow toe secured to each end of said bar and depending therefrom;
   an element whose lower part is threaded, said element making threaded engagement with said nut, extending through said well in said stem, through said collar and through said opening in said bar, said element being rotatable and movable vertically upon rotation thereof;
   means movable vertically with said element upon vertical movement of said element;
   a resilient grommet carried by each of said feet, and a pair of resilient grommets spaced from each other, and carried by said cross bar and disposed opposite the grommets carried by said feet;
   a coil compression spring having a central opening therethrough and supported by said nut, one end of said spring housed in said well in said stem and the other end thereof housed in said collar, said element extending through the central opening in said spring, said spring normally urging said bar in a direction away from said feet to open position, said means acting upon said bar to maintain said bar in a clamping position and against the action of the spring upon said bar,
   and (B) means adapted to maintain said assembly in position on said support when said member is so disposed on said support, said last mentioned means comprising a second bar terminating in threaded ears at the ends thereof and adapted to be disposed against the bottom of said support and bolts extending through said openings in said first mentioned bars and making threaded engagement with said threaded openings in said second mentioned ears.

2. A device as defined in claim 1, and a crank, said element being part of said crank.

References Cited by the Examiner

UNITED STATES PATENTS

| | | | |
|---|---|---|---|
| 2,235,012 | 3/41 | Colvin | 224—42.1 |
| 2,932,868 | 4/60 | Imparato | 24—81 |
| 2,956,813 | 10/60 | Madden | 280—11.37 |
| 2,997,762 | 8/61 | Imparato | 24—81 |

GERALD M. FORLENZA, *Primary Examiner.*

HUGO O. SCHULZ, *Examiner.*